(12) United States Patent
Archer et al.

(10) Patent No.: US 9,568,192 B1
(45) Date of Patent: *Feb. 14, 2017

(54) EMISSION CONTROL FLARE STACK FOR REDUCING VOLATILE ORGANIC COMPOUNDS FROM GASES INCLUDING WELL GASES

(71) Applicant: THE ARCHER COMPANY, INC, Stephenville, TX (US)

(72) Inventors: Lary D. Archer, Stephenville, TX (US); Kenneth Archer, Stephenville, TX (US)

(73) Assignee: THE ARCHER COMPANY, INC., Stephenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,163

(22) Filed: Sep. 18, 2015

Related U.S. Application Data

(63) Continuation-in-part of application No. 13/867,009, filed on Apr. 19, 2013, now Pat. No. 9,151,495.

(51) Int. Cl.
| | |
|---|---|
| *F23N 5/02* | (2006.01) |
| *F23G 7/08* | (2006.01) |
| *F23J 15/02* | (2006.01) |
| *F23J 7/00* | (2006.01) |
| *G05B 15/02* | (2006.01) |
| *F23J 15/00* | (2006.01) |

(52) U.S. Cl.
CPC .................. *F23G 7/085* (2013.01); *F23J 7/00* (2013.01); *F23J 15/02* (2013.01); *G05B 15/02* (2013.01); *F23G 2200/00* (2013.01); *F23G 2207/105* (2013.01); *F23G 2207/106* (2013.01); *F23G 2207/112* (2013.01); *F23J 15/00* (2013.01)

(58) Field of Classification Search
CPC ........... F23J 15/02; F23J 7/00; F23G 2200/00; G05B 15/02
USPC .......... 431/12, 5, 202, 2; 110/190, 225, 185; 60/286; 73/863
See application file for complete search history.

(56) References Cited

U.S. PATENT DOCUMENTS

| | | | |
|---|---|---|---|
| 5,425,316 A | 6/1995 | Malone | |
| 6,012,917 A * | 1/2000 | Wiseman | F23C 5/02 431/154 |

(Continued)

OTHER PUBLICATIONS

STIC Search—'163Patents & '163NPL . . . DOCs Mar. 28, 2016.*

(Continued)

*Primary Examiner* — Gregory Huson
*Assistant Examiner* — Nikhil Mashruwala
(74) *Attorney, Agent, or Firm* — Buskop Law Group, PC; Wendy Buskop

(57) ABSTRACT

An emission control flare stack for minimizing the formation of volatile organic compounds wherein the stack has a controller for operating a gas flow meter; a inlet gas regulator; an oxygen/air flow meter; an oxygen/air regulator; a burner with at least one igniter; a plurality of cooling and heating tubes; and a neutralization solution regulator. The controller receives data from a temperature sensor and an emissions sensor and is in communication with a network. The controller provides controlled burn and neutralization using air intake information and gas concentrations information and can transmit data to an administrative server, cloud computing processor, client devices or combinations thereof for continuous remote viewing of emissions using an executive dashboard.

20 Claims, 5 Drawing Sheets

(56) References Cited

U.S. PATENT DOCUMENTS

| | | | |
|---|---|---|---|
| 6,324,999 B1 | 12/2001 | Maejima | |
| 6,485,292 B1 | 11/2002 | Rhodes et al. | |
| 6,863,875 B1 | 3/2005 | Kotake et al. | |
| 6,955,042 B1 | 10/2005 | Wnuck et al. | |
| 7,318,381 B2 | 1/2008 | Arnold et al. | |
| 7,896,645 B2 * | 3/2011 | Loving | F23C 3/002 110/210 |
| 8,629,313 B2 * | 1/2014 | Hong | F23G 5/50 431/5 |
| 2004/0261673 A1 * | 12/2004 | Allen | F23N 5/082 110/342 |
| 2007/0059653 A1 * | 3/2007 | Purdy | F23G 7/08 431/5 |
| 2008/0087013 A1 * | 4/2008 | Crawley | F01N 3/0231 60/320 |
| 2009/0178391 A1 * | 7/2009 | Parrish | B01D 53/9495 60/286 |
| 2011/0116589 A1 * | 5/2011 | Lustig | G01T 3/008 376/254 |
| 2011/0252137 A1 | 10/2011 | Stienhans et al. | |

OTHER PUBLICATIONS

Environmental Protection Agency, Final Rule, 40 CFR Part 63, Oil and Natural Gas Section: New Source Performance Standards and National Emissions Standards for Hazardous Air Pollutants Reviews, 2012.

\* cited by examiner

EMISSION CONTROL FLARE STACK FOR REDUCING VOLATILE ORGANIC COMPOUNDS FROM GASES INCLUDING WELL GASES

CROSS REFERENCE TO RELATED APPLICATION

The current application is a Continuation in Part of co-pending application Ser. No. 13/867,009 filed on Apr. 19, 2013, entitled "METHOD FOR REDUCING VOLATILE ORGANIC COMPOUNDS FROM GASES WITH HYDROCARBONS". This reference is incorporated herein in its entirety.

FIELD

The present embodiments generally relate to the construction and operation of gas flare stacks with enhanced atmospheric air flow that are utilized to burn undesired by-product streams particularly from oil and gas wells, for release into the atmosphere.

BACKGROUND

A need exists for an emission control flare stack for providing reduced toxic emissions.

A further need exists for a device for decreasing the emission of greenhouse gases.

A need exists for an emission control flare stack which can be monitored from a remote location.

The present embodiments meet these needs.

BRIEF DESCRIPTION OF THE DRAWINGS

The detailed description will be better understood in conjunction with the accompanying drawings as follows.

Figure 1:
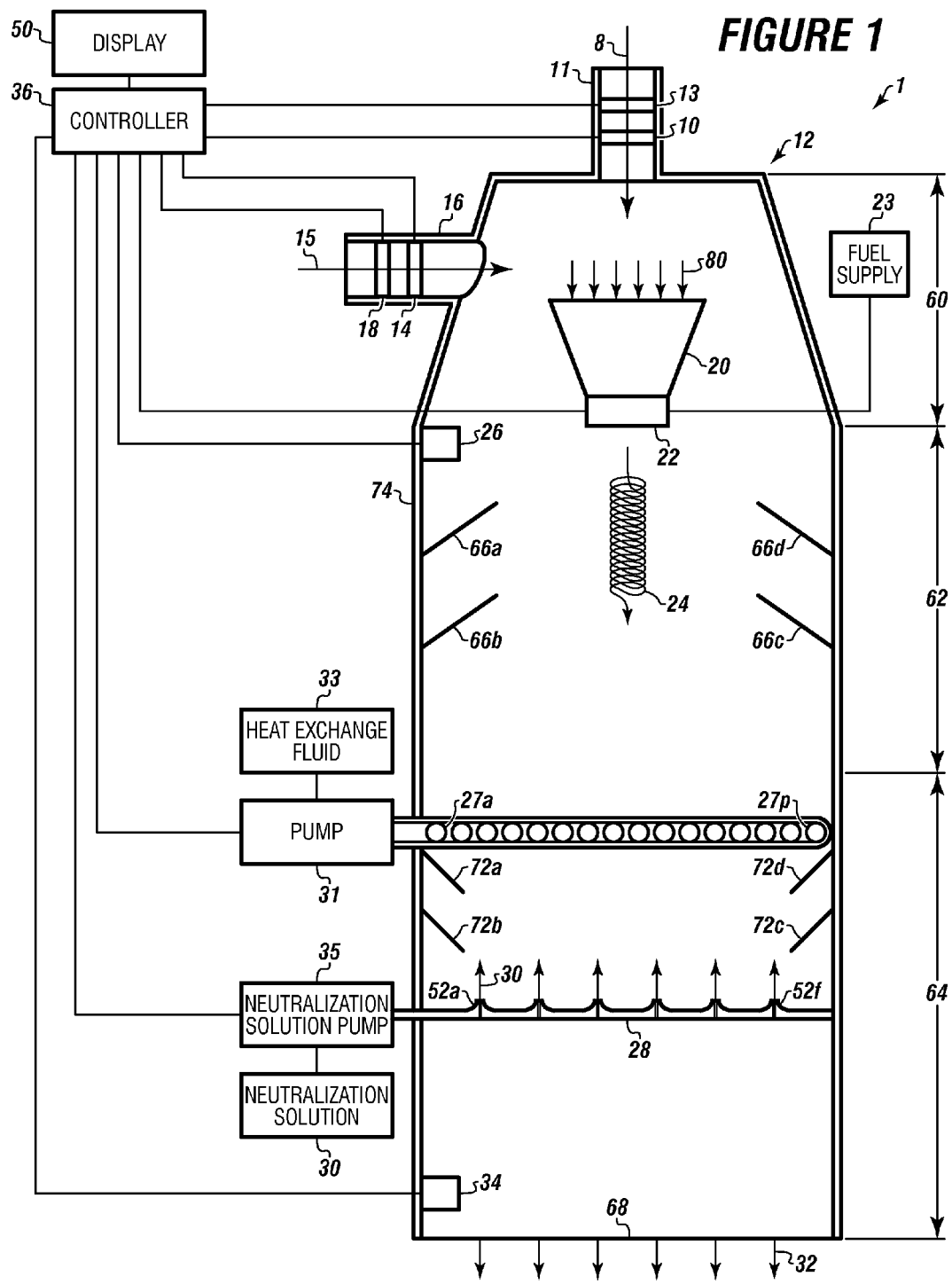
FIG. 1 is a side view of an emission control flare stack for reducing volatile organic compounds according to one or more embodiments.

The present embodiments are detailed below with reference to the listed Figures.

DETAILED DESCRIPTION OF THE EMBODIMENTS

Before explaining the present apparatus and system in detail, it is to be understood that the apparatus and system are not limited to the particular embodiments and that it can be practiced or carried out in various ways.

The present embodiments generally relate to a flare gas burner system for use with well gases released while drilling an oil or natural gas well.

The present embodiments further relate to a flare gas burner system for use with storage vessels containing greenhouse emission gas or natural gas.

Emission control flares are commonly utilized for disposing of gases, both waste gases and gases flared as a result of equipment shutdowns, plant upsets, and similar problems.

The present invention is versatile, and adapted to handle a wide variety of gas that emits from the well, and still burn effectively.

The embodiments relate to an emission control flare stack to minimize the formation of volatile organic compounds by using an emission control flare stack that can be operated automatically. In embodiments, the emission control flare stack can also inform users of the status of the emission control flare stack and status of emission from the emission control flare stack.

The emission control flare stack can have: a controller and a shell with an inlet gas intake and an oxygen/air intake, a gas flow meter connected to the gas intake and the controller, and an inlet gas regulator connected to the gas intake and the controller.

An oxygen/air flow meter can be connected to the oxygen/air intake and the controller, and an oxygen/air regulator can be connected to the oxygen/air intake and the controller.

A burner with at least one igniter can be connected to the controller for forming intermediate gas. A temperature sensor post burner can be connected to the controller for sensing the temperature of the intermediate gas. A plurality of cooling and heating tubes can be connected to the controller to form a temperature controlled intermediate gas. A neutralization solution regulator can be connected to the controller for neutralizing a portion of the temperature controlled intermediate gas forming emissions, and an emissions sensor can be connected to the controller for detecting volatile organic compound concentrations in the formed emissions.

In embodiments, the controller with processor and data storage can connect to and communicate with a network.

The emission control flare stack can have a controller that uses a library of preset limits resident in the data storage of the controller. In embodiments, the controller can communicate to a network which in turn can communicate with an administrative server, a cloud computing processor with cloud data storage, or combinations thereof.

The controller, an administrative server can be connected to the controller, or a cloud computing processor with cloud data storage can further contain computer instructions to: (i) monitor inlet of gas and oxygen/air to a shell; (ii) control ignition of the gas forming an intermediate gas; (iii) control temperature of the intermediate gas; (iv) control neutralization of volatile organic compounds in the intermediate gas forming an emission within 40 CFR part 63, effective 2015; and (v) provide information to users via a network continuously on compliance, such as with an executive dashboard.

The emission control flare stack can assist in reducing volatile organic compounds from gases containing hydrocarbons, such as well gas, and preventing the volatile organic compounds from entering the atmosphere. Embodiments of the emission control flare stack can be used to treat gases containing hydrocarbons that are released from drilling muds or otherwise at an oil well site or natural gas well site. Embodiments of the emission control flare stack can be used with storage vessels that contain greenhouse gases or natural gas.

Well gas temperatures fluctuate wildly and the present emission control flare stack can be designed to accommodate these wild temperature fluctuations.

The highly efficient emission control flare stack, when used as described, can run the burner intermittently or continuously to remove volatile organic compounds from well gases or other gases containing hydrocarbons, and provide safer emissions to comply with the 2015 Environment Protection Agency (EPA) regulation 40 CFR Part 63 [EPQ-HQ-OAR-2010-0505, FRI-RIN 2060 AP 76] on concentrations of volatile organic compound emissions.

Use of this emission control flare stack can help prevent well site operators from being jailed or fined due to lack of compliance with a new 2015 effective date EPA regulation. If a well site is not in compliance, the well site could be shut down and the production of natural gas and oil would drop, likely causing gasoline and natural gas prices to increase at the gas pump, hurting consumers.

The emission control flare stack minimizes volatile organic compound concentration and can keep well site operators free of the large fines they would otherwise incur by exceeding known EPA regulations and can also enable accelerated response by users of the emission control flare stack, enabling response in 25 percent less time than stack monitoring uses, while additionally providing continuous information on compliance with the EPA regulations 24 hours a day 7 days a week to users.

The emission control flare stack can control volatile organic compound emissions by maintaining automatically the temperature of intermediate gases post ignition from a burner that burns incoming gas, such as well gas, while simultaneously and automatically temperature controlling the intermediate gas and simultaneously and automatically injecting a neutralization solution into the temperature controlled intermediate gas. This continuous system will help prevent explosions, death, and widespread destruction when flares inadvertently ignite and explode intake gas which could have too much of a dangerous component or compound due to the continuous monitoring and comparing performed with the emission control flare stack.

The emission control flare stack can automatically neutralize volatile organic compounds, in the gas to bring volatile organic compound concentrations within the EPA regulations effective in the year 2015.

This emission control flare stack can be usable after separating gas from well fluids, to burn and treat gas automatically, such as well gas separated from drilling mud which is produced during a well drilling operation in the oil and gas industry.

This unique emission control flare stack can not only automatically control burning of well gases or other intake gases, but can also automatically enable an operator to view the status of a emission control flare stack, and automatically enable a plurality of users to view the status of multiple flares for a well, for multiple wells, multiple storage units, or combinations thereof simultaneously. The emission control flare stack can provide an executive dashboard enabling viewing of a field of emission control flare stacks simultaneously using an executive dashboard.

This unique emission control flare stack and system can enable many companies to view their specific compliance status with EPA regulations in real time and automatically with up to the minute updates on the status of volatile organic compound concentrations, and up to the minute status on emission control flare stack operations, enabling better compliance for a well site, and a healthy atmosphere.

Embodiments of the emission control flare stack can include using computer instructions which enable controllers on an individual well site location to provide one or more alarms or messages not only to an onsite field supervisor but to other users connected to the controller through the network.

The onsite field supervisor and the other users can view an executive dashboard of the emission control flare stack status and gas concentrations for gases coming into, being treated by, and going out of the emission control flare stack on a client device, enabling users remote to the site to take action if the emission control flare stack indicates volatile organic compound concentration has exceeded a preset limit in the emissions.

The term "administrative server" as used herein can refer to a computer with a processor and data storage connected to a network.

The term "controller" as used herein can refer can refer to a processor connected to data storage having computer instructions in the data storage that can communicate to sensors and devices on the emission control flare stack. In one or more embodiments, the controller can be a computer.

The term "cloud computing processor with cloud data storage" as used herein can refer to a processor with data storage that can be in a cloud computing environment to which the controller can communicate via at least one network. The cloud computing processor with cloud data storage can store and process signals from the controller or receive and process signals directly from the various sensors on the flare stack, essentially replacing the controller function on the flare stack, and placing the computing solution in the computing cloud in one or more embodiments. The cloud computing processor and cloud data storage can be one or more computers connected in the computing cloud.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "executive dashboard" as used herein can refer to a presentation of emission control flare stack information created by a single controller connected to the emission control flare stack, created by an administrative server, or created by a cloud computing processor connected to the emission control flare stack, using computer instructions for forming the presentation of information and communicating the presentation of information in real time, such as 24 hours a day, to one or more client devices via the network.

The term "igniter" as used herein can refer to a device in the burner of the flare stack that provides the fire that combusts some or most of the gas entering the emission control flare stack.

The term "network" as used herein can refer to a satellite network, a cellular network, the internet, a local area network, a similar communication network, or combinations thereof.

The term "shell" as used herein can refer to a substantially metal surrounding, such as an enclosure, that provides an inlet for the gas, an inlet for the oxygen/air, and contains a burner with an igniter, a temperature sensor, and supports heating and cooling tubes used to maintain the temperature of gas post burner referred to herein as "intermediate gas" as well as containing a neutralization solution regulator for controlled injection of a neutralization solution into temperature controlled intermediate gas, and further containing an emission sensor.

The term "user" as used herein can refer to persons or computers that connect to the network with one or more client devices to receive and monitor information from one or a plurality of one or more controllers connected to emission control flare stacks for controlling volatile organic compound formation and release.

It should be noted herein, that in the embodiments each client device can have a processor, data storage, and computer instructions that enable presentation of information from the emission control flare stack as an executive dashboard of data. Similarly, each client device can have computer instructions enabling presentation of an executive dashboard showing a plurality of emission control flare stacks as describe herein. Each client device can have a display.

The term "well gas" as used herein can refer to gas coming from a well without intermediate treatment of the gas.

Embodiments of the emission control flare stack can have controllers on individual well sites that can transmit alarms or messages not only to the onsite field supervisor, but also to other users using an executive dashboard, enabling users remote to a site to view compliance issues and take action if the emission control flare stack indicates volatile organic compound concentration has exceeded a preset limit in the emissions.

Turning now to the Figures, FIG. 1 is a diagram of an emission control flare stack for reducing volatile organic compound concentration in emissions that can connect to a network and one or more client devices.

The emission control flare stack 1 for reducing volatile organic compound content can have a gas flow meter 10 for sensing flow rates of an inlet gas 8, which can be a well gas, which flows through an inlet gas intake 11 into a shell 12.

The gas flow meter 10 can be a Turbine Meter, T model made by Cameron International Corporation of Houston, Tex.

The flow rate of inlet gas into the emission control flare stack can range from 1 mcf to 10,000,000 mcf.

The inlet gas can contain various components, including methane and $CO_2$ which can be burned by a burner. The inlet gas can have at least one hydrocarbon. The inlet gas, in embodiments, can contain benzene and $NO_x$.

The inlet gas intake can be a tube, such as a pipe with a diameter from 1 inch to 4 inches. In embodiments the inlet gas intake can connect to a drill mud circulating system connected to a well.

The shell, which can be a metal surrounding, can have a length from 5 feet to 40 feet and an inner diameter ranging from 1 inch to 20 inches at a first end. At the first end, the shell can be a burner cone. At the opposite end of the shell, the diameter of the emission outlet 68 can be from 9 inches to 72 inches. The shell can be formed in three distinct segments.

In embodiments, the portion of the shell 12 that contains the gas intake and a burner can have the burner cone 60. The burner cone can have tapered sides, such as at angles from 1 degree to 45 degrees from a longitudinal axis.

In embodiments, the shell with the burner cone 60 can be welded or otherwise fastened to a shell body 62. The shell body 62 can be cylindrical. The burner cone 60 can be tapered, and is depicted tapering away from the inlet gas intake 11. The burner cone can have an inner diameter that ranges from 2 inches in diameter to 10 inches in diameter on the inlet gas intake end. In embodiments, the burner cone can be a cylinder or another shape that can have a contained inlet gas intake. At the opposite, wider end of the burner cone the diameter can range from 6 inches to 48 inches.

Connected to the burner cone can be a shell body. The shell body 62 can have a constant diameter. The diameter of the shell body 62 can range from 6 inches to 48 inches.

Attached to the shell body 62 can be a shell heating and cooling segment 64. The shell heating and cooling segment 64 is depicted as flaring away, increasing in diameter from the diameter of the shell body 62. The inner diameter of the shell heating and cooling segment 64 can range from 6 inches to 102 inches.

The three segments of the shell can be made from steel, aluminum alloys, or other metals. The three segments forming the shell can have a wall thickness ranging from 0.25 inches to 1 inch.

The emission control flare stack 1 can have an inlet gas regulator 13 for regulating flow of the inlet gas 8 flowing through the inlet gas intake 11. The inlet gas regulator 13 can be a Back Pressure Valve made by Kimray, Inc. of Oklahoma City, Okla.

An oxygen/air flow meter 14 can be connected to the shell 12 at the oxygen/air intake 16. The oxygen/air flow meter 14 can be used for sensing flow rates of oxygen/air 15 flowing into an oxygen/air intake 16 and mixing into the inlet gas 8 in the shell 12. A usable oxygen/air flow meter 14 can be a flow analyzer made by Cameron International Corporation. One or more oxygen/air flow meters can connect to a controller.

An oxygen/air regulator 18 can be used for regulating flow of oxygen/air 15 through the oxygen/air intake 16. A turbine, such as those made by Quality Turbocharger Components of Houston, Tex., can be used as the oxygen/air regulator 18. One or more oxygen/air regulators can connect to a controller.

The flow rate of the oxygen/air 15 into the inlet gas in the shell can range from 1 cubic foot to 500 cubic feet per minute. The diameter of the oxygen/air intake 16 can range from 1 inch to 6 inches.

In the shell, after the gas containing at least one hydrocarbon mixes with the oxygen/air, a burner 20 with at least one igniter 22 can ignite to burn all or a portion of components in the gas mixture. The burner 20 can connect to a power supply or fuel supply 23 as well as a controller. A usable burner can be one such as those made by D.B.I. of Bastrop, Tex. Usable burners with igniters can produce heat from 600 degrees Fahrenheit to 1200 degrees Fahrenheit.

In the shell 12, after the oxygen/air 15 mixes with the inlet gas 8, a gas mixture 80 can be formed.

The controller 36 can connect to the oxygen/air regulator, the oxygen/air flow meter, and the burner. The controller can be used to cause the burner to ignite, burning components in the gas mixture forming an intermediate gas 24.

The burn at the igniter can be a continuous burn, or can be an intermittent burn depending on comparisons of data made by the controller using sensors and flow meters connected to the shell and computer instructions in the controller having tables or lists of preset limits for different blends of oxygen and inlet gas with at least one hydrocarbon.

A temperature sensor 26 in the shell 12 can be used for detecting temperature of the intermediate gas 24 and transmitting temperature information to the controller 36.

A usable temperature sensor can be a Murphy Temperature Switch made by DK Controls of Irving, Tex.

In an embodiment, ridges 66a-66d can be formed on the interior of the shell post burner at an angle to cause the intermediate gas 24 to form a vortex, that is, a swirling, helical mass of intermediate gas.

The ridges 66a-66d can be from 2 inches to 12 inches in height rising from an interior surface of the shell body 62. Each of the plurality of ridges can be oriented at an angle from 20 degrees to 80 degrees from the flow path of intermediate gas in the shell thereby creating a swirling, helical gas flow which ensures thorough mixing. Each ridge can be from 2 inches to 12 inches long. The ridges can be made from steel or another material that will not corrode easily in the presence of the hydrocarbon component.

From 4 to 32 ridges can be used in the shell body 62, such as from 10 to 20 ridges positioned equidistantly around the inner surface of the shell body.

The plurality of ridges 66a-66d can be formed in the shell to create a vortex of the intermediate gas 24 prior to introducing the intermediate gas to the plurality of heating and cooling tubes 27a-27p.

The portion of the shell 12 that contains the ridges, temperature sensor 26, and intermediate gas 24 can be the shell body 62 which can have a diameter from 6 inches to 48 inches larger than the diameter of the burner cone, for enhanced mixing, and for forming a more uniformly blended intermediate gas.

In some embodiments, the shell 12 can have the same diameter as the exit end of the burner cone.

The shell 12 can have a shell heating and cooling segment 64 which has the emission outlet 68. A plurality of cooling and heating tubes 27a-27p can be positioned around the shell in the shell heating cooling segment on the inside of the shell.

In other embodiments, the heating and cooling tubes can be on the outside of the shell and on the inside of the shell.

The plurality of cooling and heating tubes in the shell are for regulating temperatures of the intermediate gas 24 to within preset limits that are determined using computer instructions in the controller and using sensor data collected from the flow meters and sensors on the shell.

The plurality of cooling and heating tubes can be substantially uniformly disposed around the shell for heating and cooling the intermediate gas 24, in an embodiment, and can provide a substantially increased surface area as compared to a flat surface. The heating and cooling tubes can be controlled with a fluid that is pumped into and out of the tubes from a heat pump with reservoir or similar control means. In an embodiment, from 10 cooling and heating tubes to 300 cooling and heating tubes can be used in the shell. In embodiments, each heating and cooling tube can have an inner diameter from 0.5 inches to 3 inches.

The heating and cooling tubes can receive a heat exchange fluid 33 that can be pumped using a pump 31 to and from the heating and cooling tubes.

In an embodiment, the shell heating and cooling segment 64 can have a larger diameter than the burner cone for enhanced mixing of the temperature controlled intermediate gas 24 as it contacts a neutralization solution 30 pumped from a neutralization solution pump 35 through a plurality of low pressure fluid injectors 52a-52f to mix with the intermediate gas 24 after being either heated or cooled, depending on the controller's computation of temperatures and volatile organic compound emission content by the heating and cooling tubes.

In embodiments, the neutralization solution regulator can introduce the neutralization solution into the heated or cooled gas mixture after the gas contacts the heating and cooling tubes, using a residence time from 5 seconds to 60 seconds to form a emission with reduced volatile organic compound concentration.

In an embodiment, a layer of insulation 74 can be disposed at least partially around the shell, or in another embodiment, entirely around the shell.

In an embodiment, just prior to the neutralization solution regulator, a plurality of directional vanes 72a-72d can be installed to ensure the gas flows towards the nozzles of the neutralization solution regulator. Each directional vane can be oriented from 95 degrees to 180 degrees along the longitudinal axis of the gas flow path. Each vane can have a height of from 0.1 inch to 1 inch and a length of from 1 inch to 5 inches to improve concentration of the gas towards the neutralization solution. The vanes can be made form a non-corroding high temperature material in an embodiment.

In an embodiment, a neutralization solution regulator 28 can control introduction of a neutralization solution 30 into the intermediate gas 24.

A neutralization solution regulator 28 can be used with a plurality of low pressure fluid injectors 52a-52f for injecting a neutralization solution 30 into the intermediate mixture opposite a flow direction 54 of the intermediate solution to form an emission 32. In an embodiment, the neutralization solution can be ammonia, urea or combinations thereof. In embodiments, the neutralization solution can be a catalytic oxidative-reduction oxygen catalyst such as platinum supported, titanium supported, or rhodium supported catalyst.

In embodiments, the low pressure fluid injectors 52a-52f can disperse the neutralization solution as a mist with droplet sizes ranging from 1 micron to 5 microns. In embodiments, the low pressure fluid injectors 52a-52f can introduce the neutralization solution into the intermediate stream at a low pressure from 1 psi to 50 psi.

An emissions sensor 34 can be used for detecting volatile organic compound concentration in the emission 32 exiting the shell 12. The emission sensor can be connected to the controller 36. The emission sensor 34 can be a volatile organic compound sensor that is a volatile organic compound sensor made by Neutronics, Inc. of Exton, Pa.

The emission sensor can transmit a detected volatile organic compound concentration to the controller 36. The controller 36 can include a processor in communication with a data storage and an optional display 50 can further communicate with a network. The display 50 can be used for viewing results and computation of the controller.

Also shown is a pump 31 for flowing heat exchange fluid 33 into and out of the plurality of heating and cooling tubes. A neutralization solution pump 33 of the neutralization solution regulator 28 can be adapted for flowing neutralization solution 30 into the neutralization solution regulation.

Figure 2:
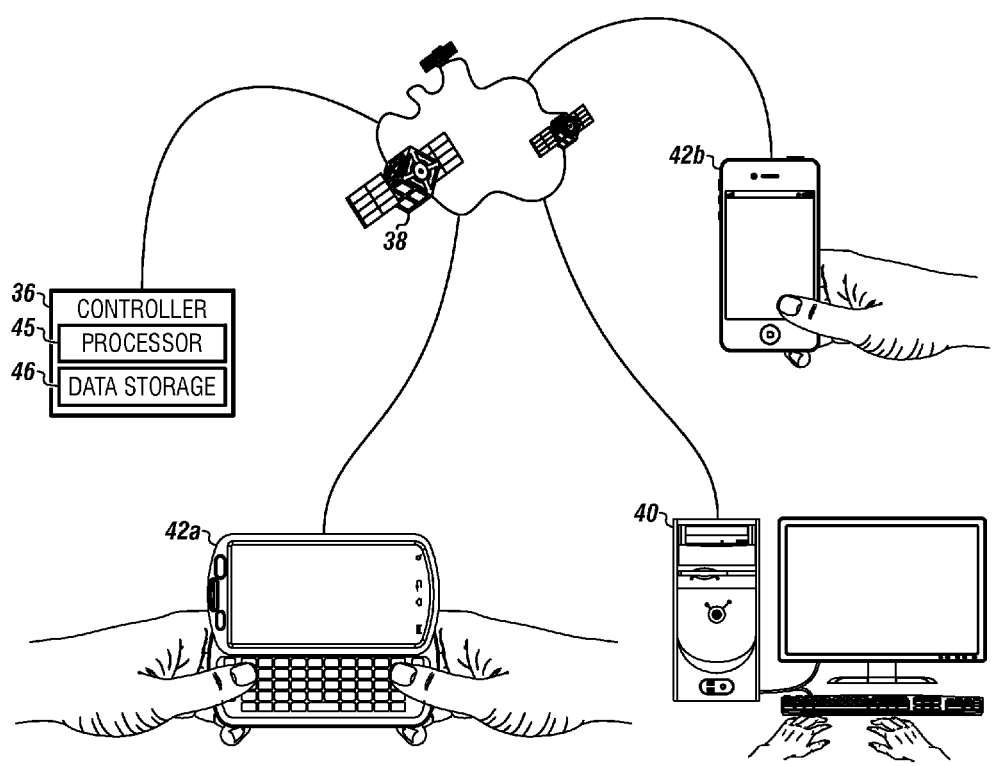
FIG. 2 shows an embodiment of a controller with a processor using computer instructions in a data storage for communicating volatile organic compound concentrations to a network connected to an administrative server and a plurality of client devices according to one or more embodiments.

FIG. 2 shows that in an embodiment, a controller 36 with a processor 45 using computer instructions in the data storage 46 can communicate with at least one network 38, which can be a computing cloud or a plurality of networks, to a remote administrative server 40, that can be a computer with a processor and a data storage, and a plurality of client devices 42a and 42b each having a processor, data storage and a display.

The controller 36 can have a processor 45 connected to a data storage 46, and computer instructions for (i) controlled flow of gas and oxygen/air into the shell forming a gas mixture, (ii) controlled ignition of the gas mixture forming an intermediate gas, (iii) temperature control of the intermediate gas, and (iv) controlled neutralization of volatile organic compounds in the intermediate gas forming an emission 32 within 40 CFR part 63 effective 2015.

Figure 3A:
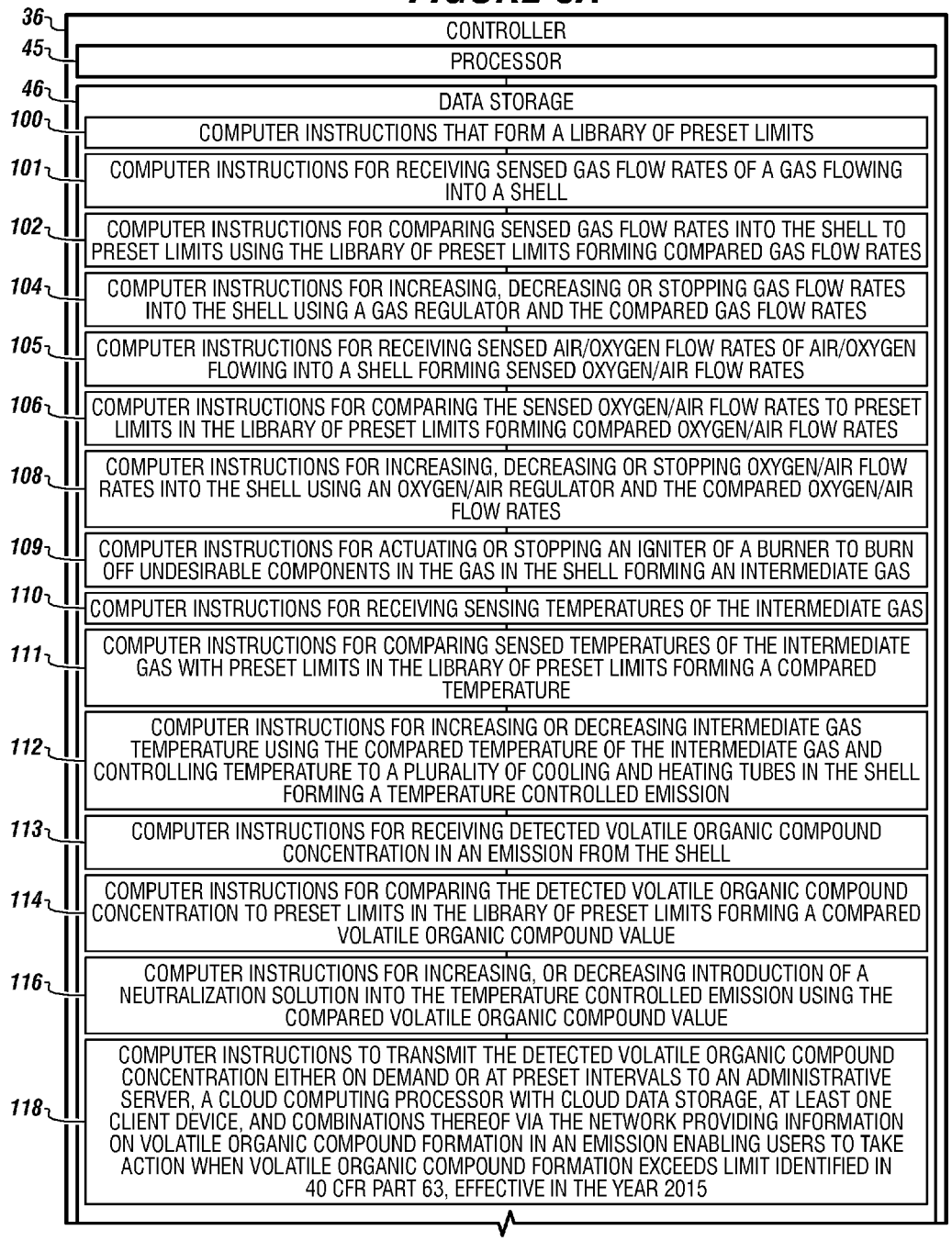
FIGS. 3A and 3B are a diagram of the data storage of the controller and the computer instructions used by the controller according to one or more embodiments.
Figure 3B:
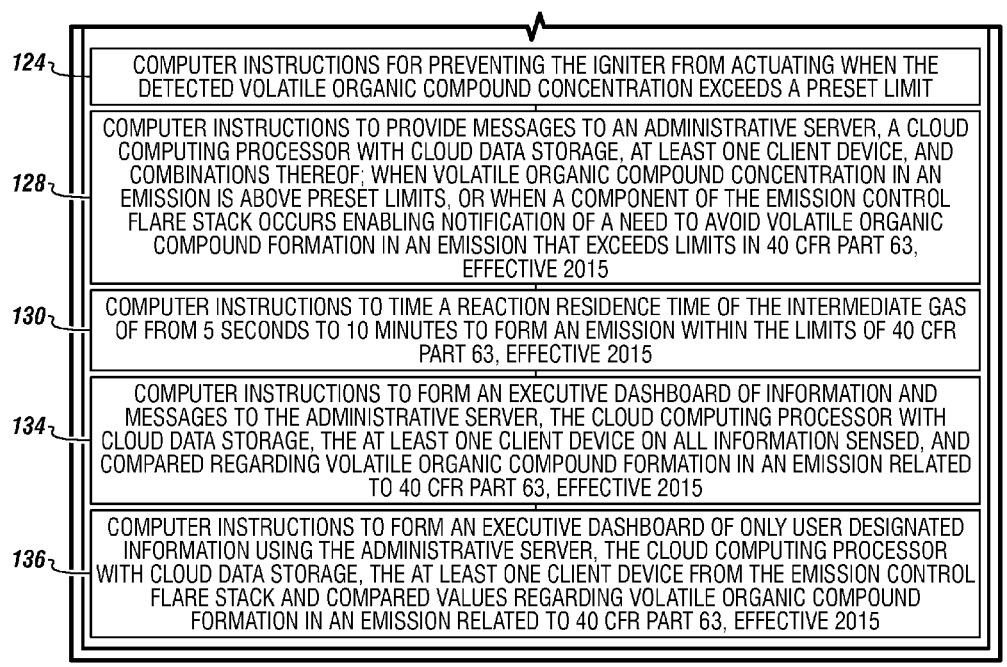

In the data storage can be pluralities of computer instructions which are further depicted in FIGS. 3A and 3B.

The computer instructions in the data storage 46 can be used to sense and control flow rates of gases and oxygen gas mixtures, control burn rates of igniters in a burner, regulate temperature of volatile organic compound emissions; regulate the introduction of a neutralization solution into the volatile organic compound emissions for gases in the emission control flare stack.

In embodiments, the data storage can include computer instructions to automatically compare the signals from the sensors' preset temperature, pressure, and volatile organic compound content limits, and adjusts burn rates, oxygen intake, inlet gas intake, and quantities of neutralization solution.

In general, the computer instructions can control flow rates of gases, control flow rates of oxygen gas mixtures, control burn rates of igniters in a burner, regulate temperature in intermediate gases, regulate the introduction of a neutralization solution into the temperature controlled intermediate gases, and monitor volatile organic compound emission from the flare stack transmitting the information to the executive dashboards of the client devices at periodic intervals or continuously.

The controller 36 can include a processor 45 and a data storage 46.

The data storage 46 can include computer instructions that form a library of preset limits 100 which can include tables of gas content, oxygen/air content, temperatures, and neutralization solution content to produce emissions with volatile organic compound content that does not exceed the limits set in the 2015 Code of Federal Regulations effective Jan. 1, 2015 part 63.

The data storage 46 can include computer instructions for receiving sensed gas flow rates of a gas flowing into a shell 101.

The data storage 46 can include computer instructions for comparing sensed gas flow rates into the shell to preset limits using the library of preset limits forming compared gas flow rates 102.

The data storage 46 can include computer instructions for increasing, decreasing or stopping gas flow rates into the shell using a gas regulator and the compared gas flow rates 104.

The data storage 46 can include computer instructions for receiving sensed oxygen/air flow rates of oxygen/air flowing into a shell forming sensed oxygen/air flow rates 105.

The data storage 46 can include computer instructions for comparing the sensed oxygen/air flow rates to preset limits in the library of preset limits forming compared oxygen/air flow rates 106.

The data storage 46 can include computer instructions for increasing, decreasing or stopping oxygen/air flow rates into the shell using an oxygen/air regulator and the compared oxygen/air flow rates 108.

The data storage 46 can include computer instructions for actuating or stopping an igniter of a burner to burn off undesirable components in the gas in the shell forming an intermediate gas 109.

The data storage 46 can include computer instructions for receiving sensing temperatures of the intermediate gas 110.

The data storage 46 can include computer instructions for comparing sensed temperatures of the intermediate gas with preset limits in the library of preset limits forming a compared temperature 111.

The data storage 46 can include computer instructions for increasing or decreasing intermediate gas temperature using the compared temperature of the intermediate gas and controlling temperature to a plurality of cooling and heating tubes in the shell forming a temperature controlled emission 112.

The data storage 46 can include computer instructions for receiving detected volatile organic compound concentration in an emission from the shell 113.

The data storage 46 can include computer instructions for comparing the detected volatile organic compound concentration to preset limits in the library of preset limits forming a compared volatile organic compound value 114.

The data storage 46 can include computer instructions for increasing, or decreasing introduction of a neutralization solution into the temperature controlled emission using the compared volatile organic compound value 116.

The data storage 46 can include computer instructions to transmit the detected volatile organic compound concentration either on demand or at preset intervals to an administrative server, a cloud computing processor and cloud computing data storage, at least one client device, and combinations thereof via the network providing information on volatile organic compound formation in an emission enabling users to take action when volatile organic compound formation exceeds limit identified in 40 CFR part 63, effective in the year 2015 118.

The data storage 46 can include computer instructions for preventing the igniter from actuating when the detected volatile organic compound concentration exceeds a preset limit 124.

The data storage 46 can include computer instructions to provide messages to an administrative server, a cloud computing processor with cloud data storage, at least one client device, and combinations thereof; when volatile organic compound concentration in an emission is above preset limits, or when a component of the emission control flare stack occurs enabling notification of a need to avoid volatile organic compound formation in an emission that exceed limits in 40 CFR part 63, effective 2015 128.

The data storage 46 can include computer instructions to time a reaction residence time of the intermediate gas from 5 seconds to 10 minutes to form an emission within the limits of 40 CFR part 63, effective 2015 130.

The data storage 46 can include computer instructions to form an executive dashboard of information and messages to the administrative server, the cloud computing processor with cloud data storage, the at least one client device on all information sensed, and compared regarding volatile organic compound formation in an emission related to 40 CFR part 63, effective 2015 134.

The data storage 46 can include computer instructions to form an executive dashboard of only user designated information using the administrative server, the cloud computing processor with cloud data storage, the at least one client device from the emission control flare stack and compared values regarding volatile organic compound formation in an emission related to 40 CFR part 63, effective 2015 136.

The information can be detected and compared continuously by the controller and can be continuously provided to an administrative server, a cloud computing processor with cloud data storage, and at least one client device via the network.

Figure 4:
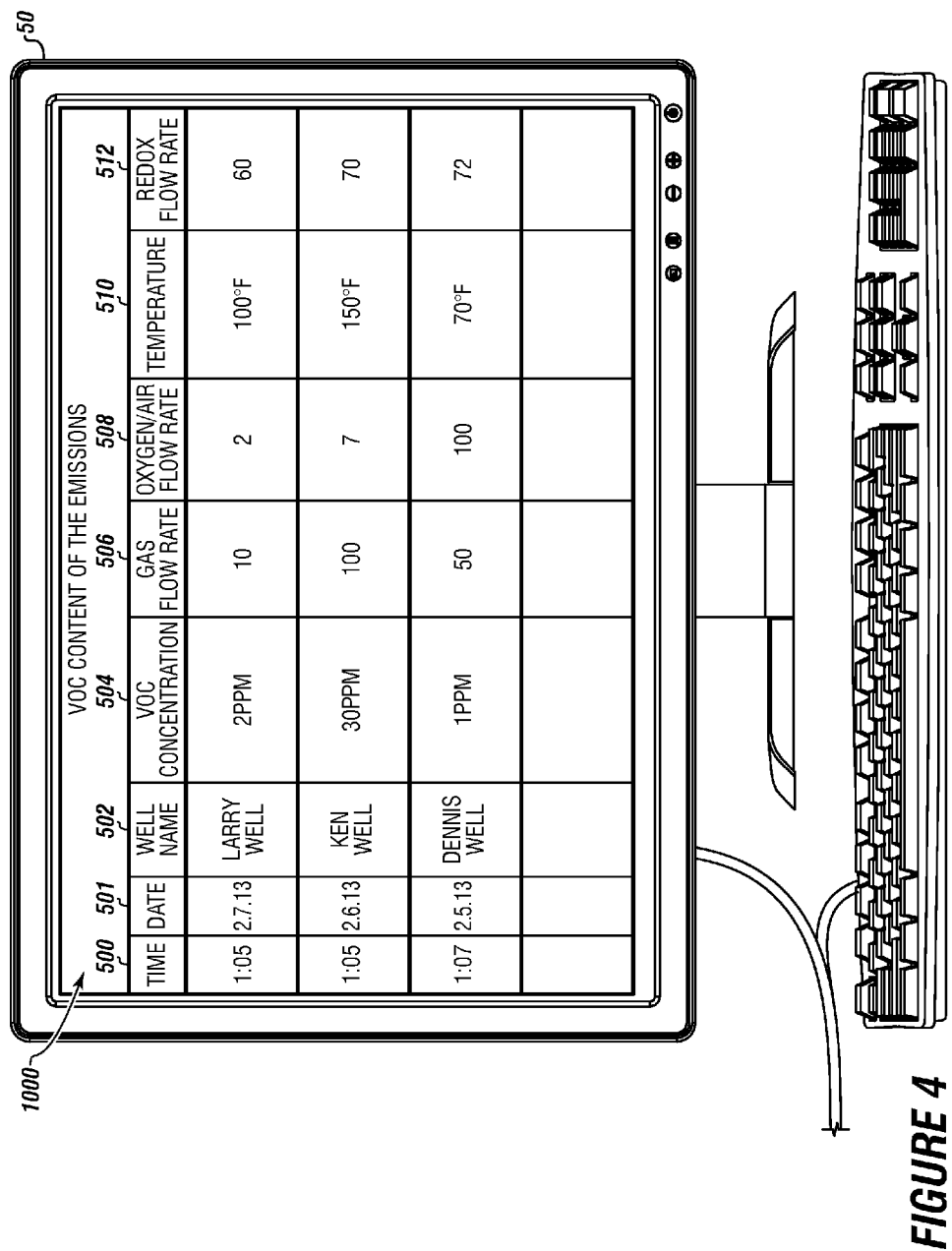
FIG. 4 is a diagram of an executive dashboard of continual monitoring for the controller regarding volatile organic compound content of the emissions according to one or more embodiments.

FIG. 4 is a diagram of an executive dashboard of continual monitoring for the controller regarding volatile organic compound content of the emissions shown on a display 50.

In this executive dashboard 1000, time 500 and date 501 can be viewable along with the well name 502.

For each well, a volatile organic compound concentration 504 is shown, 2 ppm, 30 ppm, and 1 ppm.

Also on the executive dashboard 1000 can be a gas flow rate 506 in cubic feet per minute, shown as 10, 100 and 50, respectively.

The oxygen/air flow rate 508 is also depicted in cubic feet per minute as 2, 7, and 100, respectively.

The temperature 510 of the intermediate gas is shown as 100 degrees Fahrenheit, 150 degrees Fahrenheit and 70 degrees Fahrenheit. The flow rate of the catalytic oxidative-reduction oxygen catalyst, called the catalytic oxidative-reduction oxygen flow rate 512 can also displayed on the dashboard as the controllers determine the rate of 60, 70 and 72.

While these embodiments have been described with emphasis on the embodiments, it should be understood that within the scope of the appended claims, the embodiments might be practiced other than as specifically described herein.

What is claimed is:

1. An emission control flare stack for enhancing combustion of an undesired chemical substance in a gas and minimizing the formation of volatile organic compounds, wherein the emission control flare stack comprises:
   a. a shell with an inlet gas intake and an oxygen/air intake having a controller with a processor and a data storage;
   b. a gas flow meter connected to the controller for sensing flow rates of an inlet gas flowing through the inlet gas intake;
   c. an inlet gas regulator connected to the controller for regulating flow of the inlet gas through the inlet gas intake;
   d. an oxygen/air flow meter connected to the controller for sensing flow rates of oxygen/air through the oxygen/air intake into the inlet gas in the shell;
   e. an oxygen/air regulator connected to the controller for regulating flow of oxygen/air through the oxygen/air intake;
   f. a burner with at least one igniter connected to the controller for receiving the oxygen/air mixed with the inlet gas and burning components in the inlet gas forming an intermediate gas;
   g. a temperature sensor connected to the controller for detecting temperature of gas proximate the at least one igniter;
   h. a plurality of cooling and heating tubes in the shell connected to the controller for regulating temperature of the intermediate gas to within preset limits;
   i. a neutralization solution regulator in the shell connected to the controller for controlled introduction of a neutralization solution into the intermediate gas forming an emission;
   j. an emissions sensor connected to the controller for detecting volatile organic compound concentration in the emission while exiting the shell; and
      wherein the controller is in communication with a network, a pump for flowing heat exchange fluid into and out of the plurality of heating and cooling tubes; a neutralization pump adapted for flowing the neutralization solution into and out of the neutralization solution regulator, and the controller comprises the processor connected to the data storage, and the data storage comprises computer instructions for (i) controlled flow of gas and oxygen/air into the shell, (ii) controlled ignition of the gas forming an intermediate gas, (iii) temperature control of the intermediate gas, and (iv) controlled neutralization of volatile organic compound components in the intermediate gas forming an emission within 40 CFR part 63 effective 2015.

2. The emission control flare stack of claim 1, wherein the controller with the processor connected to the data storage comprises:
   a. a library of preset limits comprising: tables of gas content, oxygen/air content, temperatures, and neutralization solution content to produce emissions with volatile organic compound content that does not exceed the limits set in the 40 CFR part 63, effective 2015;
   b. computer instructions for receiving sensed gas flow rates of a gas flowing into a shell;
   c. computer instructions for comparing sensed gas flow rates into the shell to preset limits using the library of preset limits forming compared gas flow rates;
   d. computer instructions for increasing, decreasing or stopping gas flow rates into the shell using a gas regulator and the compared gas flow rates;
   e. computer instructions for receiving sensed oxygen/air flow rates of oxygen/air flowing into a shell forming sensed oxygen/air flow rates;
   f. computer instructions for comparing the sensed oxygen/air flow rates to preset limits in the library of preset limits forming compared oxygen/air flow rates;
   g. computer instructions for increasing, decreasing or stopping oxygen/air flow rates into the shell using an oxygen/air regulator and the compared oxygen/air flow rates;
   h. computer instructions for actuating or stopping the at least one igniter of a burner to burn off undesirable components in the gas in the shell forming an intermediate gas;
   i. computer instructions for receiving sensing temperatures of the intermediate gas;
   j. computer instructions for comparing sensed temperatures of the intermediate gas with preset limits in the library of preset limits forming a compared temperature;
   k. computer instructions for increasing or decreasing intermediate gas temperature using the compared temperature of the intermediate gas and controlling temperature to a plurality of cooling and heating tubes in the shell forming a temperature controlled emission;
   l. computer instructions for receiving detected volatile organic compound concentration in an emission from the shell;
   m. computer instructions for comparing the detected volatile organic compound concentration to preset limits in the library of preset limits forming a compared volatile organic compound value;
   n. computer instructions for increasing, or decreasing introduction of the neutralization solution into the temperature controlled emission using the compared volatile organic compound value; and
   o. computer instructions to transmit the detected volatile organic compound concentration either on demand or at preset intervals to an administrative server, a cloud computing processor with cloud data storage, at least one client device, and combinations thereof via the network providing information on volatile organic compound formation in an emission, enabling users to take action when volatile organic compound formation exceeds limit identified in 40 CFR part 63, effective in the year 2015.

3. The emission control flare stack of claim 1, wherein the neutralization solution regulator comprises a plurality of low pressure fluid injectors for creating a mist of the neutralization solution for blending into intermediate gas opposite a flow direction of the intermediate gas.

4. The emission control flare stack of claim 1, wherein the neutralization solution is ammonia, urea or combinations thereof.

5. The emission control flare stack of claim 1, wherein the neutralization solution is a catalytic oxidative-reduction oxygen catalyst.

6. The emission control flare stack of claim 1, wherein the shell comprises:

a. a burner cone surrounding the burner;

b. a shell body on a first end connected to the burner cone; and c. a shell heating cooling segment engaging a second end of the shell body, wherein the shell heating cooling segment increases in diameter away from the shell body, thereby forming the shell that has a gradually enlarging inner diameter from burner cone to an emission outlet.

7. The emission control flare stack of claim 1, wherein the plurality of cooling and heating tubes are substantially uniformly disposed around the shell for heating and cooling the intermediate gas.

8. The emission control flare stack of claim 7, wherein from 10 cooling and heating tubes to 300 cooling and heating tubes are used in the shell.

9. The emission control flare stack of claim 7, wherein each cooling and heating tube has an inner diameter from 0.5 inches to 3 inches.

10. The emission control flare stack of claim 1, wherein from 1 low pressure fluid injector to 100 low pressure fluid injectors are used in the shell to introduce neutralizing mist against the flow of the temperature controlled intermediate gas.

11. The emission control flare stack of claim 1, wherein the low pressure fluid injectors disperse the neutralization solution as a mist with droplet sizes ranging from 1 micron to 3 microns.

12. The emission control flare stack of claim 1, wherein the low pressure fluid injectors introduce the neutralization solution into the intermediate stream at a low pressure from 1 psi to 50 psi.

13. The emission control flare stack of claim 1, wherein the neutralization solution regulator using a residence time from 5 seconds to 10 minutes of the neutralization solution with the temperature controlled intermediate gas to form an emission with reduced volatile organic compound concentration.

14. The emission control flare stack of claim 1, further comprising a plurality of ridges formed in the shell post igniter to create a vortex of the intermediate gas prior to introducing the intermediate gas to the plurality of heating and cooling tubes.

15. The emission control flare stack of claim 1, further comprising a plurality of directional vanes oriented to centralize a direction of flow of the intermediate gas.

16. The emission control flare stack of claim 1, wherein the shell comprises a layer of insulation completely surrounding the shell.

17. The emission control flare stack of claim 1, further comprising computer instructions in the data storage to time a reaction residence time of the intermediate gas from 5 seconds to 10 minutes to form an emission within the limits of 40 CFR part 63, effective 2015.

18. The emission control flare stack of claim 1, further comprising computer instructions in the data storage to prevent the igniter from actuating when the detected volatile organic compound concentration exceeds a preset limit.

19. The emission control flare stack of claim 1, further comprising computer instructions in the data storage to provide messages to an administrative server, a cloud computing processor and a cloud computing data storage, at least one client device, and combinations thereof; when volatile organic compound concentration in an emission is above the preset limits, or when a component of the emission control flare stack occurs enabling notification of a need to avoid volatile organic compound formation in an emission that exceed limits in 40 CFR part 63, effective 2015.

20. The emission control flare stack of claim 1, further comprising computer instructions in the data storage to form an executive dashboard of information and messages to the administrative server, the cloud computing processor and data storage, the at least one client device on all information sensed, and compared regarding volatile organic compound formation in an emission related to 40 CFR part 63, effective 2015.

* * * * *